Nov. 27, 1951     H. GOLDBERG     2,576,593
CUTTER BAR FOR LAWN MOWERS AND THE LIKE
Filed Aug. 9, 1945     3 Sheets-Sheet 1
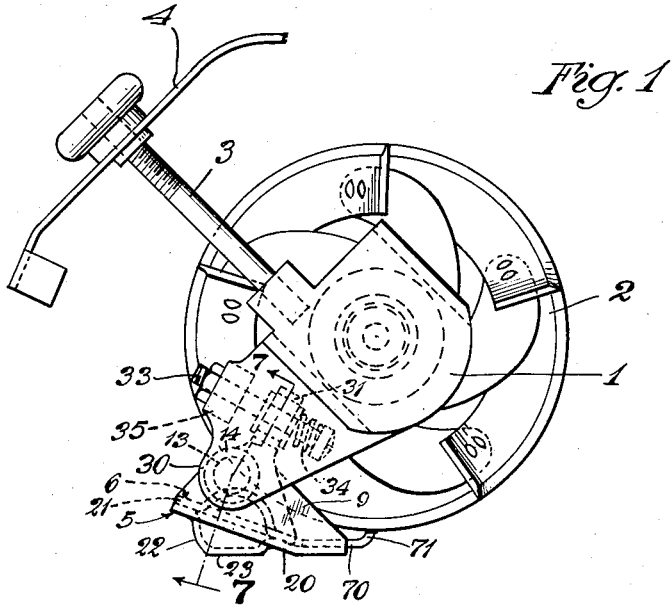
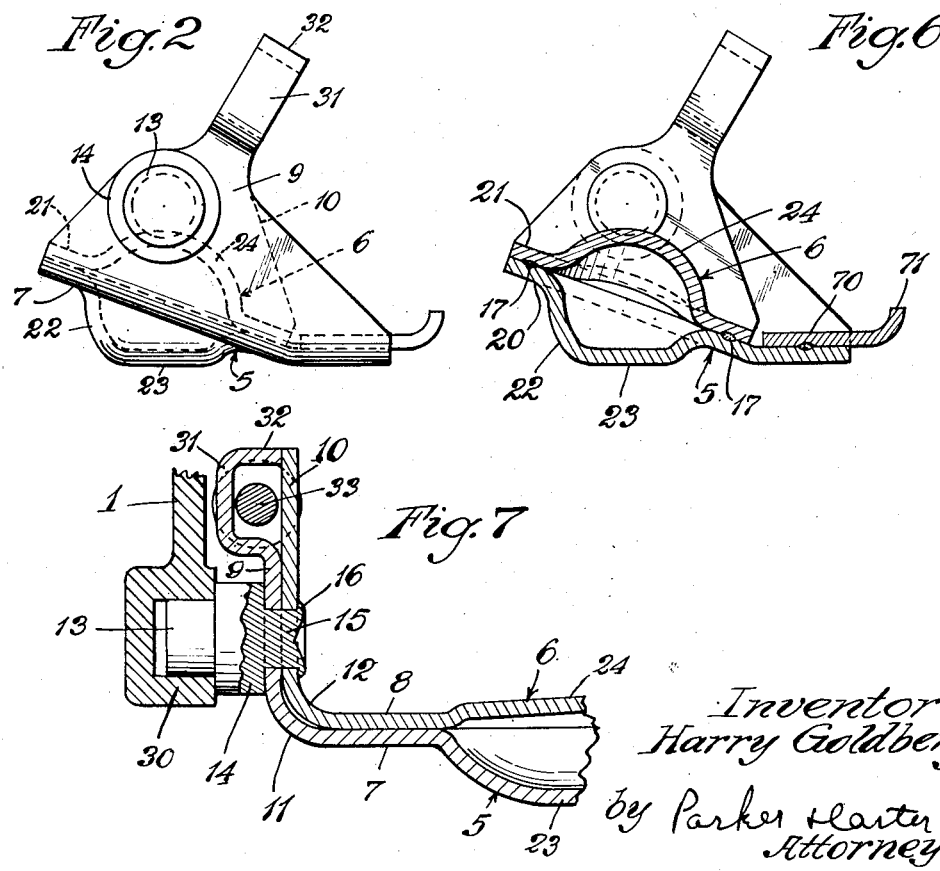

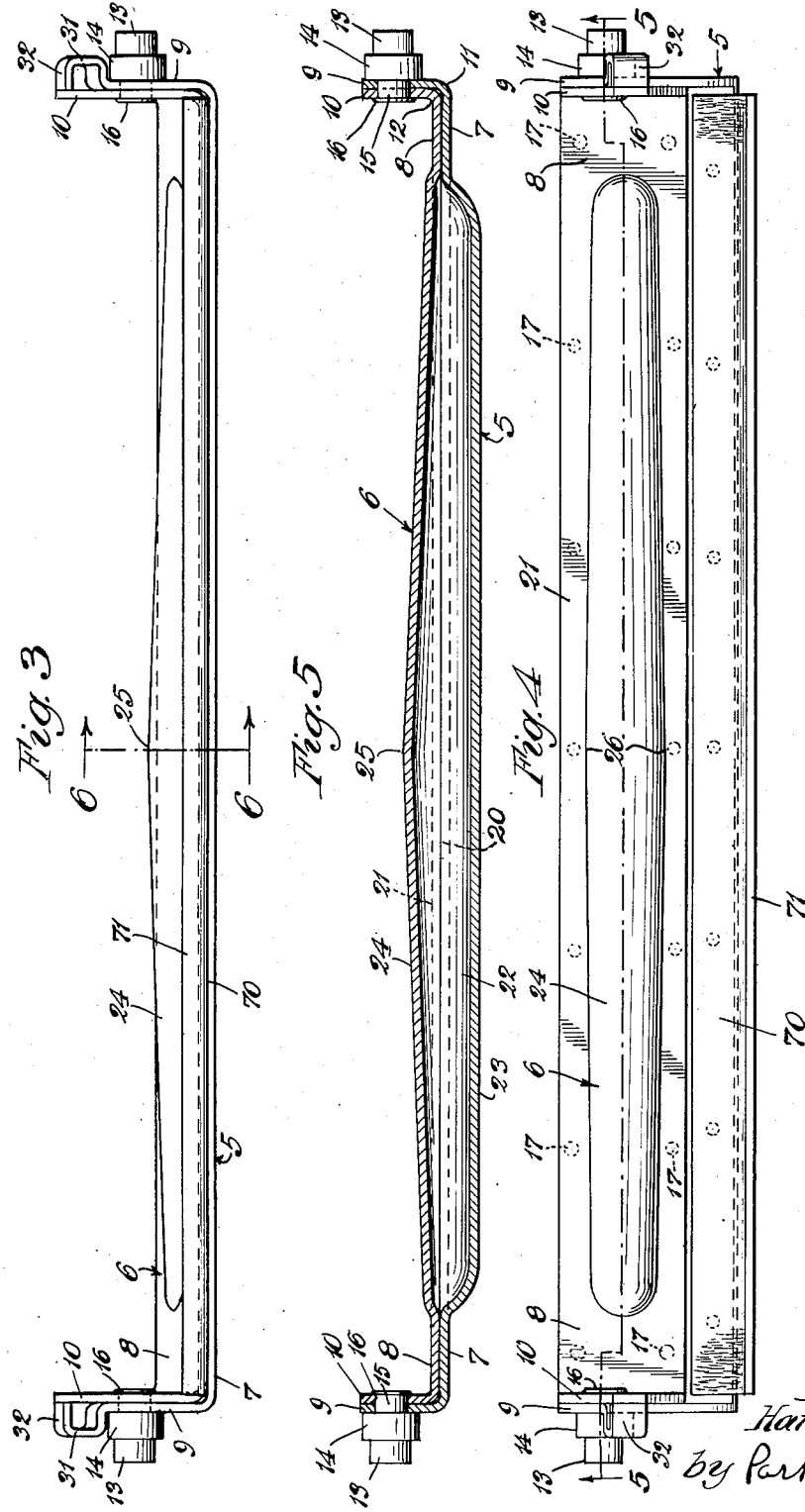

Nov. 27, 1951 — H. GOLDBERG — 2,576,593
CUTTER BAR FOR LAWN MOWERS AND THE LIKE
Filed Aug. 9, 1945 — 3 Sheets-Sheet 3
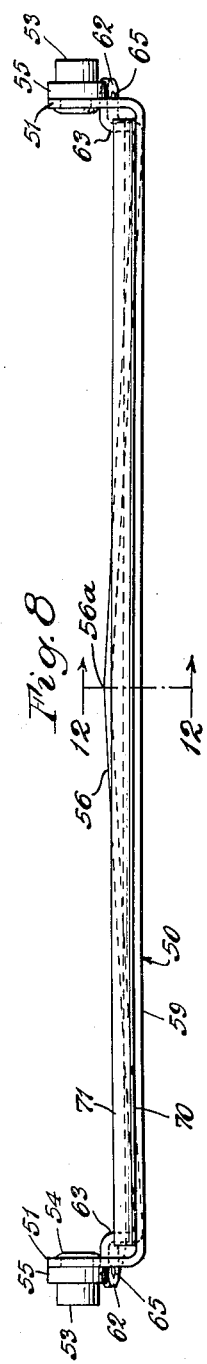
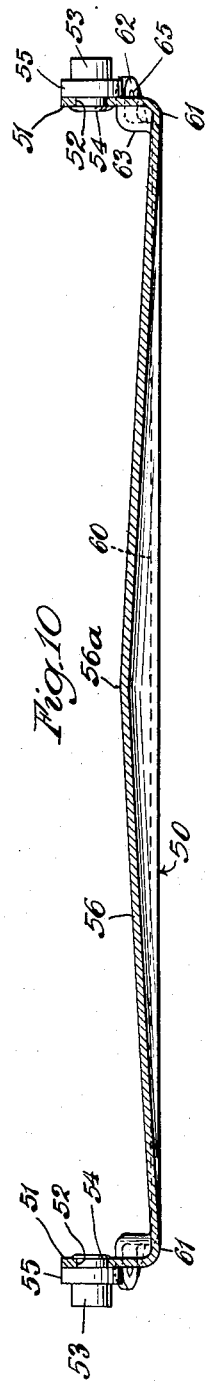
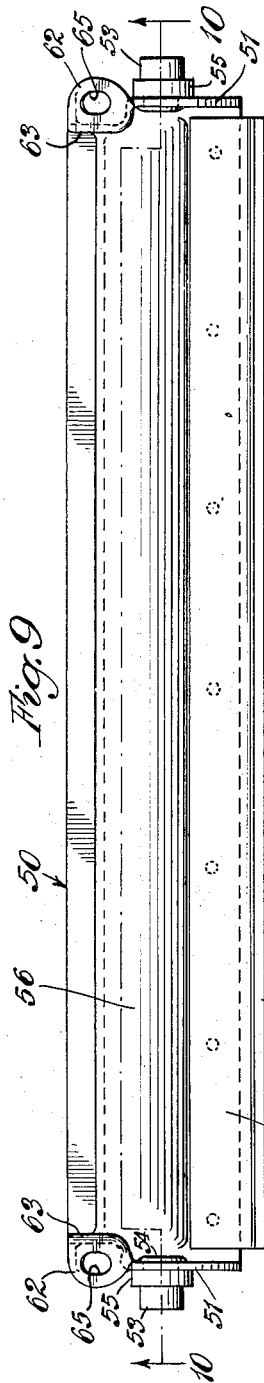
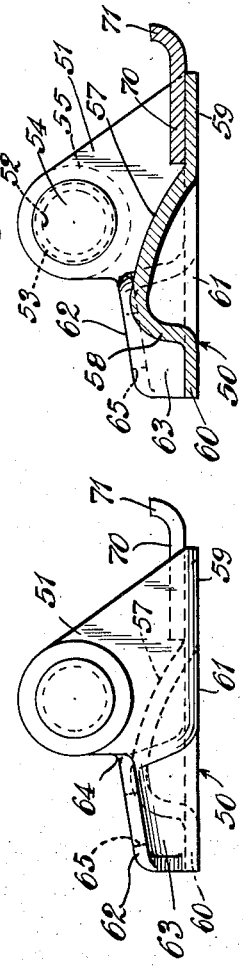
Inventor
Harry Goldberg
by Parker & Carter
Attorneys.

Patented Nov. 27, 1951

2,576,593

UNITED STATES PATENT OFFICE 2,576,593

CUTTER BAR FOR LAWN MOWERS AND THE LIKE

Harry Goldberg, Chicago, Ill., assignor, by mesne assignments, to Pioneer Gen-E-Motor Corporation, Chicago, Ill., a corporation of Delaware Application August 9, 1945, Serial No. 609,837

2 Claims. (Cl. 56—289)

This invention relates to an improvement in cutter bars such as are used for example with lawn mowers.

One purpose is to provide a cutter bar of maximum strength.

Another purpose is to provide a cutter bar of maximum strength and lightness.

Another purpose is to simplify and economize the manufacture of such cutter bars.

Another purpose is to provide a cutter bar which maintains a cutter edge of maximum rigidity and trueness.

Other purposes will appear from time to time in the course of the specification and claims.

The invention is illustrated more or less diagrammatically in the accompanying drawings wherein:

Figure 1 is an end elevation illustrating the cutter bar and parts of a lawn mower to which it is applied;

Figure 2 is an enlarged end elevation of a cutter bar structure;

Figure 3 is a perspective front view on a smaller scale of the entire cutter bar structure.

Figure 4 is a plan view of the cutter bar structure;

Figure 5 is a section on the line 5—5 of the structure shown in Figure 4;

Figure 6 is a section on an enlarged scale on the line 6—6 of Figure 3;

Figure 7 is an enlarged section on the line 7—7 of Figure 1;

Figure 8 is an elevation of a variant form;

Figure 9 is a plan view of the form of Figure 8;

Figure 10 is a section on the line 10—10 of Figure 9;

Figure 11 is an enlarged end elevation; and

Figure 12 is an enlarged section on the line 12—12 of Figure 8.

Like parts are indicated by like symbols throughout the specification and drawings.

Referring to the drawings 1 generally indicates a supporting end plate upon which any suitable reel structure, generally indicated as 2 is rotatably mounted. Numeral 3 is an adjusting means for the supporting plate 1. Numeral 4 indicates part of the housing which is secured to or forms part of a lawn mower chassis.

The cutter bar structure proper is shown as including a bottom plate 5 of sheet metal and a top plate 6 of sheet metal. The two plates at their ends have engaging face portions 7, 8. These end portions are both upwardly bent as at 9, 10 respectively. It will be noted that the bend of the lower plate, as at 11, has a substantially larger radius than the bend of the upper plate at 12. Thus at that point the plates are somewhat separated and the upper plate forms a corner reinforcement. The upwardly bent portions 9 and 10 may be formed in any suitable way to receive a pivot element. I illustrate for example a pivot pin having a pivot portion 13, and an enlargement 14 which abuts against the exterior of the plate portion 9, and a portion 15 which extends through aligned apertures in the members 9 and 10 and which may be upset as at 16 to assist in locking the assembly together. The two plates may be secured together at their ends, and along their sides by any suitable means. I illustrate spot welds 17, but spot welding is only one of a number of convenient methods of securing the two parts together.

Considering Figures 3, 4, and 5 it will be noted that the two plates 5 and 6 are not only secured to each other at their end portions 7 and 8 but are also secured to each other along side portions 20, 21. The intermediate unsecured portions 22, 23, and 24 of the plates 5 and 6 are formed apart and are separated progressively endwise toward the middle of the cutter bar structure. Thus the lower plate 5 is downwardly formed as at 22. As a matter of convenience this downward forming may have a flat bottom portion 23. The upper plate is upwardly formed to provide the concavo convex portion 24. It will be noted that this concavo convex portion 24 inclines upwardly slightly toward a middle point 25, which is the point of maximum separation between the separated parts of the blades 5 and 6. Note also as in Figures 2 and 6, that the separated parts of the two plates form in effect a hollow beam. The width of the separation also increases somewhat toward the central portion, as is indicated at 26 in Fig. 4. The pivot end portions 13 may penetrate any suitable socket 30 in the side plate 1. The lower or outer plate 5 also has end outwardly offset portions 31 with rebent ends 32 the ends abutting against the upper edge of the portions 9 of the upper plate 6. Through the intervening space may extend any suitable adjusting pin 33, spring loaded as at 34, the pin passing through any suitable abutment 35 on the side plate 1. It will be understood that whereas this is a satisfactory adjusting means any suitable adjusting means may be employed, the present invention being directed to the structure of the cutter bar itself and its mode of manufacture.

Referring to the form of Figs. 8 to 12, I illustrate a form in which the body of the cutter blade is stamped or formed or upset from a single piece of sheet metal, which corresponds to the upper plate 6 of the form of Figs. 1 and following. Referring to the drawings I show a single plate generally indicated as 50. It is shown as having upwardly bent end portions 51 which have a reinforcing function and which may be employed for pivoting the blade to the lawn mower. I illustrate the portions 51 as apertured as at 52 to receive the pivot members 53 which may be held in position by being upset as at 54 to hold the enlarged portion 55 against the outer face of the member 51. Numeral 56 indicates a concavo convex integral reinforcing rib which extends between the ends of the cutter bar. I may employ a wide variety of forms and proportions of rib, but I find it advantageous to employ a rib which is upwardly convex and downwardly concave, as will be clear from Figs. 11 and 12. It is shown as including a forward and rather gradually sloped or curved portion 57 and a rearward and more sharply downwardly turned portion 58. The portion 57 is shown as merging in a front plane portion 59 whereas the portion 58 merges with a corresponding plane rear edge portion 60. The two portions 59 and 60 may be connected to a continuous end plane portion 61 at each end of the blade. It will be noted that the reinforcing rib 56 tapers upwardly toward the center of the bar, as at 56a, the effective thickness of the reinforced bar thus formed being greatest at its center and reducing progressively toward the ends of the bar. As a further reinforcement, and as a means for permitting adjustment of the blade about its pivot I employ an offset ear or lug 62 one side of which, as at 63, projects upwardly from and merges with the rear plane portion or edge 60 of the blade. The portion 62 also is connected to the end portions 51, as at 64. It may be apertured as at 65 to permit any suitable guiding or actuating member to pass therethrough.

In both forms of the blade I illustrate a separate cutter blade or edge member generally indicated as 70 and having an upwardly curved edge portion 71. The blade proper 70 may be welded or otherwise secured to the cutter bar structure. Preferably is is formed of sheet metal with the grain of the metal generally perpendicular to the edge of the blade.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

For example whereas I have illustrated the cutter bar with separately formed blades it will be understood that I may form the blade otherwise. However, it may be advantageous to employ a separate blade, of different material, and to harden it either before or after its application to the bar, in order to avoid the necessity of hardening the edge portion of the bar proper.

The use and operation of the invention are as follows:

I have developed a simple, strong and efficient cutter bar for lawn mowers and the like, which is economical to manufacture and rugged in use. Broadly stated, I form or stamp or upset a cutter bar structure from sheet metal. While its shape, and the number of parts employed, may vary, in its most simple form, I may strike or form the entire structure from a single piece of sheet metal. It is advantageous however to apply separate pivot members, as shown at 13, 14 of the form of Fig. 1 and following and as at 53, 55 in the form of Figs. 8 and following. Particularly with a long cutter bar for a larger mower it may be advantageous to employ the two connected sheet metal members 5 and 6, as shown in the form of Figs. 1 and following. However the single layer form of Figs. 8 and following is practical and efficient, particularly in cutter bars of smaller length.

I show a separate blade such as is shown at 70, 71, in both forms of the device. I may separately harden the edge, as by induction.

I find it advantageous to employ sheet metal and to strike or form or press or stamp the bar from sheet metal, it being understood that it may be shaped or formed by a wide variety of methods.

In order to permit or provide for adjustment of the cutter bar about its pivot, and referring first to the form of Figures 1 to 6, I provide a preferably integral pivoted lever portion in the form of the offset 31, 32 of the lower plate 5 which, with the upper offset lug 10 of the upper plate 6, forms an upper ear through which any suitable adjusting member 33 may extend. In the form of Figures 8 and following I upset an integral ear or lug 62, 63 with its aperture 65. Whereas an integral lever or offset portion or lug is preferable I do not wish to be limited thereto.

I claim:

1. In a cutter bar for lawn mowers and the like, a sheet metal cutter bar including a bottom sheet metal element and a top sheet metal element, the elements being of the same length but of different widths, each element having an integral longitudinal concavo-convex reinforcing rib, the concavity of each two ribs being opposite whereby they define, with the surrounding parts of the sheet metal elements, a hollow box-like truss, the two elements being secured together about the hollow so formed, each element having a plane portion forwardly of the reinforcement so formed, the forward plane portion of one being of greater width than the forward plane portion of the other, and a blade member permanently secured to the wider of the two portions, the two elements abutting throughout their entire width at the end of the cutter bar thus formed and being upwardly turned together at their ends in a normal bend, and a pivot member secured to and extending through the upwardly turned portion of the two elements, through aligned openings, the two elements being integrally connected at a plurality of abutting points.

2. The structure of claim 1 characterized in that the upturned ends of the elements are locally separated to provide a closed loop adapted to receive an adjusting member.

HARRY GOLDBERG.

REFERENCES CITED

The following references are of record in the file of this patent:

UNITED STATES PATENTS

| Number | Name | Date |
|---|---|---|
| 1,724,879 | Kachel | Aug. 13, 1929 |
| 1,809,810 | Coldwell | June 9, 1931 |
| 2,260,297 | Clemson | Oct. 28, 1941 |
| 2,266,307 | Clemson | Dec. 16, 1941 |
| 2,401,611 | Carlson | June 4, 1946 |